United States Patent
Morein et al.

(10) Patent No.: US 6,473,086 B1
(45) Date of Patent: Oct. 29, 2002

(54) METHOD AND APPARATUS FOR GRAPHICS PROCESSING USING PARALLEL GRAPHICS PROCESSORS

(75) Inventors: Stephen L. Morein, Cambridge, MA (US); Andrew E. Gruber, Arlington, MA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/457,649

(22) Filed: Dec. 9, 1999

(51) Int. Cl.[7] .............................................. G06F 15/80
(52) U.S. Cl. ........................ 345/505; 345/422; 345/537; 345/549; 710/22
(58) Field of Search ................................ 345/502–506, 345/552, 422, 536–538, 549, 520, 519, 531, 589, 591–593; 710/22, 30, 33

(56) References Cited

U.S. PATENT DOCUMENTS 5,008,838 A * 4/1991 Kelleher et al. ............ 345/422
5,712,664 A * 1/1998 Reddy ........................ 345/519
6,317,124 B2 * 11/2001 Reynolds ................... 345/422

OTHER PUBLICATIONS

"Onyx2 Reality, Onyx2 InfiniteReality and Onyx2 Infinite-Reality2 Technical Report," Silicon Graphics, Inc.

* cited by examiner

Primary Examiner—Kee M. Tung
(74) Attorney, Agent, or Firm—Vedder, Price, Kaufman & Kammholz

(57) ABSTRACT

A method and apparatus for graphics processing that utilizes multiple graphics processors in parallel is presented. A primary graphics processor is operably coupled to a primary memory that includes a primary color buffer and a primary Z buffer. The primary processor processes a first portion of the image data for a frame, where processing the first portion stores color data in the primary color buffer and Z data in the primary Z buffer. A secondary processor is operably coupled to a secondary memory that includes a secondary color buffer and a secondary Z buffer. The secondary processor processes a second portion of the image data for the frame. The processing of the second portion of the image data results in color data being stored in the secondary color buffer and Z data being stored in the secondary Z buffer. The display signal that results in the image data for the frame being displayed is generated by a display driver included in the primary processor. In one embodiment, the display driver retrieves all of the color data used to generate the display signal from the primary color buffer. As such, the secondary processor transfers the color data for the second portion of the frame from the secondary color buffer to the primary color buffer to facilitate generation of the display signal. This data transference preferably occurs utilizing direct memory access (DMA) transfers that may be initiated during the vertical blanking interval portion of the display signal.

24 Claims, 4 Drawing Sheets

METHOD AND APPARATUS FOR GRAPHICS PROCESSING USING PARALLEL GRAPHICS PROCESSORS

FIELD OF THE INVENTION

The invention relates generally to graphics processing and more particularly to a method and apparatus for graphics processing using parallel graphics processors.

BACKGROUND OF THE INVENTION

Computers are used in many applications. As computing systems continue to evolve, the graphical display requirements of the computing systems become more demanding. This is especially true in applications where detailed three-dimensional graphical displays must be updated quickly. One example of such an application is a computer game where movement and modification of numerous images on the screen may place great demands on the processing power of the computing system.

In a typical video graphics processing system, a single graphics processor utilizes a frame buffer that stores color and Z information for each of the pixels that make up the display frame. The graphics processor renders images into the frame buffer, where the rendering may include comparing color and Z values of received or generated image data with that already stored in the frame buffer. Once rendering of the display image has been completed in the frame buffer, the color data stored in the color portion of the frame buffer is read out and used to generate the display signal that is provided to the display. As the complexity of images increases and the processing operations corresponding to those images also increases, the processing requirements may exceed the processing limitations of such graphics processors.

One technique that can increase the graphics processing bandwidth in a system is to employ multiple processors to perform the graphics processing operations. Prior art systems that incorporated multiple processors to perform the graphics processing. for a single display have suffered from a number of drawbacks that reduce their efficiency of operation and cost effectiveness.

One such prior art system employed two processors where each processor has its own local memory for performing the graphics processing operations. Each graphics processor produced a display stream based on the portion of the display frame that it was responsible for processing. An external combination block was then used to combine the display stream portions generated by each of the graphics processors to form a composite display stream. Unfortunately, such prior art systems implement the display driver, which typically includes a digital to analog converter for generating an analog display signal, as a separate component or integrated circuit. This increases the cost associated with such an implementation. Another problem is the requirement for a high level of synchronization between the pixel clocks corresponding to each of the graphics processors. This additional requirement further increases costs and reduces the potential for implementing the system in a commercially viable manner.

Therefore, a need exists for a method and apparatus for graphics processing that utilizes two or more graphics processors in parallel in a manner that does not require an external display driver.

DETAILED DESCRIPTION OF THE PREFERRED EMBODIMENT OF THE INVENTION

Generally, the present invention provides a method and apparatus for graphics processing that utilizes a primary and a secondary graphics processor. The primary graphics processor is operably coupled to a primary memory that includes a primary color buffer and a primary Z buffer. The primary processor processes a first portion of the image data for a frame, where processing the first portion stores color data in the primary color buffer and Z data in the primary Z buffer. The secondary processor is operably coupled to a secondary memory that includes a secondary color buffer and a secondary Z buffer. The secondary processor processes a second portion of the image data for the frame. The processing of the second portion of the image data results in color data being stored in the secondary color buffer and Z data being stored in the secondary Z buffer. The display signal that results in the image data for the frame being displayed is generated by a display driver included in the primary processor. In one embodiment, the display driver retrieves all of the color data used to generate the display signal from the primary color buffer. As such, the secondary processor transfers the color data for the second portion of the frame from the secondary color buffer to the primary color buffer to facilitate generation of the display signal. This data transference preferably occurs utilizing direct memory access (DMA) transfers that may be initiated during the vertical blanking interval portion of the display signal.

By utilizing two or more processors to cooperatively process the image data for a frame, additional processing bandwidth can be leveraged to perform complex graphics processing operations. Because each of the processors is coupled to its own local memory, the processing operations that typically require multiple reads and writes to such memory structures can be performed in an efficient manner. However, once the processing operations are complete and the image data to be displayed is stored in the respective local memories, the image data can be combined into a single memory and read out by a display driver to generate the display signal.

Figure 1:
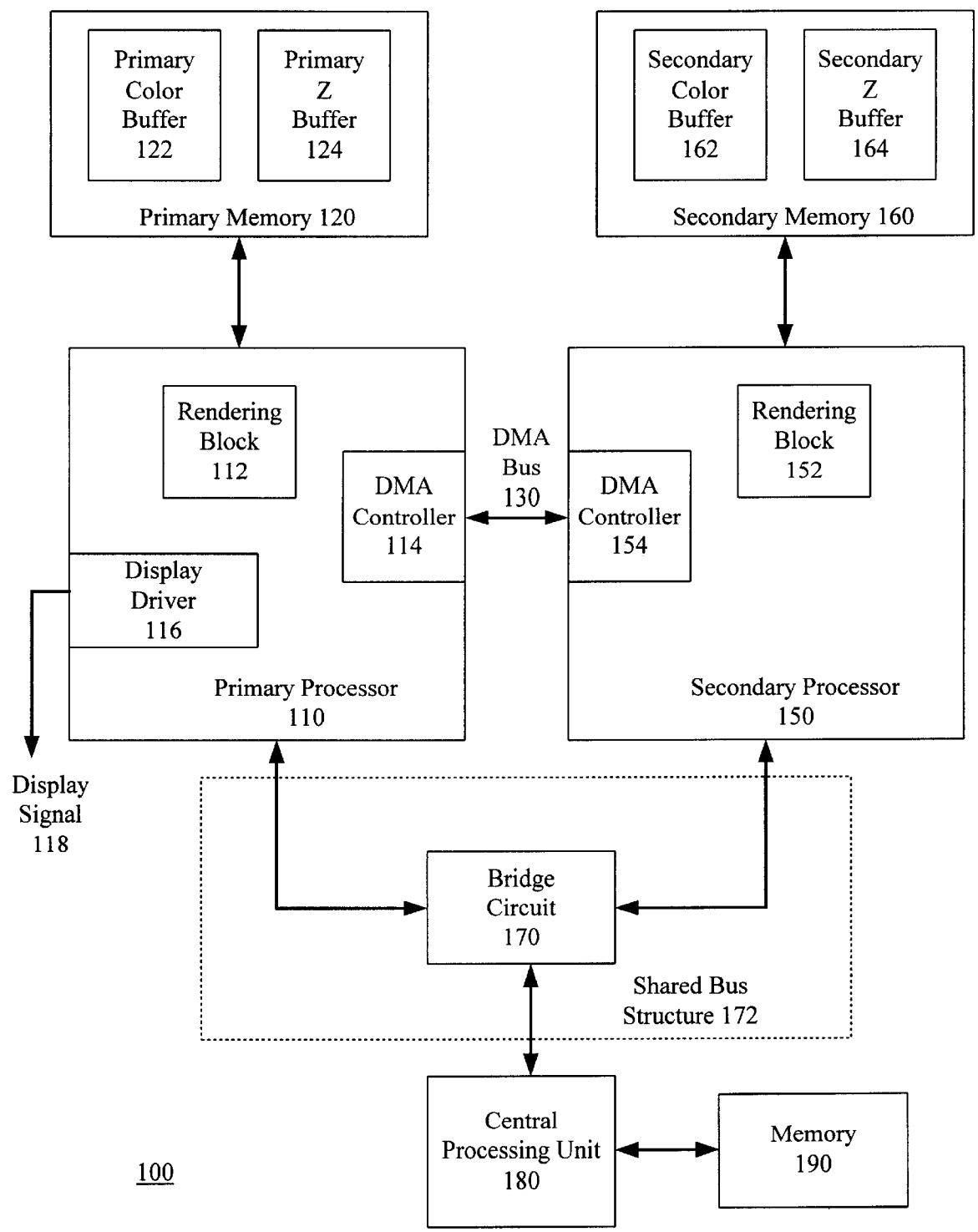
FIG. 1 illustrates a block diagram of a graphics processing circuit in accordance with a particular embodiment of the present invention.

The invention can be better understood with reference to FIGS. 1–5. FIG. 1 illustrates a graphics processing circuit 100 that includes a primary processor 110, a secondary processor 150, a primary memory 120, and a secondary memory 160. The primary and secondary processors may each be individual integrated circuits. Each of the primary and secondary processors 110 and 150 preferably include circuitry that makes up a three-dimensional graphics rendering pipeline. Thus, the rendering block 112 and the rendering block 152 are preferably capable of rendering three-dimensional images.

The primary memory 120, which is operably coupled to the primary processor 110, includes a primary color buffer 122 and a primary Z buffer 124. The primary processor processes a first portion of image data for a frame, where the processing operations for the first portion store color data for the first portion in the primary color buffer 122 and Z data for the first portion in the primary Z buffer 124. Preferably, the primary processor 110 recognizes the relevant portions of graphics primitives that it receives, where relevant portions are those portions of the primitives that effect pixels included in the first portion of the frame.

The processing operations performed by the primary processor 110 with regard to the first portion of the image data for the frame include rendering operations that may be performed by the rendering block 112. Such rendering operations include receiving graphics primitives and generating pixel fragments which are then combined with stored pixel data in the primary color buffer 122 and the primary Z buffer 124 to generate the final image for the first portion of the display. The Z data is the depth coordinate corresponding to a pixel that is used in three-dimensional graphics processing to determine if a particular portion of a graphics primitive is visible. The Z data is used to determine which primitive portions lie behind portions of other primitives and are therefore not visible to a viewer. The use of such Z values and three-dimensional rendering operations are well known in the art.

The secondary memory 160 includes a secondary color buffer 162 and a secondary Z buffer 164. The secondary memory 160 is operably coupled to the secondary processor 150, and the secondary processor 150 processes a second portion of the image data for the frame. Preferably, the first and second portions of the image data make up the complete set of image data for a frame. As the secondary processor 150 processes the second portion of the image data for the frame, it stores color data for the second portion in the secondary color buffer 162 and stores Z data for the second portion in the secondary Z buffer 164. The processing operations performed by the secondary processor 158 include rendering operations that may be performed by the rendering block 152 that is included in the secondary processor 150.

Because the secondary processor 150 only processes image data for the second portion of the frame, the secondary processor 150 preferably recognizes and only acts upon image data that is relevant to the second portion of the frame. Thus, if a primitive is received that includes pixel coordinates that only correspond to pixels included in the first portion of the frame, the secondary processor 150 will disregard such a primitive. If a primitive is received that includes pixel coordinates that correspond to both the first and second portions of the frame, each of the primary and secondary processors 110 and 150 will process the primitive at least to the point where the relevant pixels for that primitive included in their respective portions are processed.

The secondary processor 150 is operably coupled to the primary processor 110 in a manner such that it is capable of receiving a data transfer indication from the primary processor 110. The data transfer indication instructs the secondary processor 150 to transfer the color data stored for the frame in the secondary color buffer 162 to the primary color buffer 122. In the embodiment illustrated in FIG. 1, the display driver 116 of the primary processor 110 generates the display signal 118 by fetching color data from the primary color buffer 122. Preferably, the display driver 116 includes a digital to analog convert such that an analog display signal can be generated. Thus, in order to generate a display signal 118 that encompasses the entire frame, the color data for the second portion of the frame must be transferred from the secondary color buffer 162 into the primary color buffer 122.

The data transfer indication provided to the secondary processor 150 may be relayed using a dedicated signal line that is operably coupled to the primary and secondary processors. In other embodiments, the primary processor 110 and the secondary processor 150 may be intercoupled using a shared bus structure 172, where the shared bus structure couples the primary processor 110 and the secondary processor 150 to a central processing unit (CPU) 180 of the processing system. In one embodiment, the primary processor 110, the primary memory 120, the secondary memory 160, and the secondary processor 150 may be included in a video graphics expansion card that is used in a personal computer. In such an embodiment, the central processing unit 180 represents the central processor of the computer, which is operably coupled to memory 190. The central processing unit 180 may execute software stored in the memory 190 that results in the generation of different graphics images for display.

The shared bus structure 172 may include a bridge circuit 170 as shown in FIG. 1, where the bridge circuit 170 couples the primary and secondary processors 110 and 150 to the central processing unit 180. Note that additional processors, memory, or other circuits may also be coupled to the shared bus structure 172.

In the case where the graphics processing circuit 100 includes the central processing unit 180, the data transfer indication may be generated by the primary processor 110 or by the central processing unit 180. Preferably, the data transfer indication is generated based on the display signal 118 such that the data transfer occurs during a portion of the display signal 118 in which data is not being actively fetched from the primary color buffer 122. In one embodiment, the data transfer indication is generated based on a vertical blanking interval (VBI) portion of the display signal. The vertical blanking interval corresponds to the point in the display signal where the scanning device has reached the bottom of the display and is being reset to the top of the display. This represents a point during which the display signal 118 is not delivering pixel color data to the scanning device. As such, the bandwidth of the primary memory 120 is available for receiving data from the secondary color buffer 162.

In order to facilitate efficient and timely transfer of the color data from the secondary color buffer 162 to the primary color buffer 122, direct memory access (DMA) transfers may be utilized. DMA transfers are well understood in the art. The DMA transfers may be performed by DMA controllers 114 and 154 that are included in the primary processor 110 and the secondary processor 150, respectively. Each DMA controller preferably generates one of the source and destination addresses required for the DMA transfers. Thus, if color data is being transferred from the secondary color buffer 162 into the primary color buffer 122, the DMA controller 154 generates the source addresses used to fetch the color data from the secondary color buffer 162, and the DMA controller 114 generates the destination addresses used for storing the data being transferred into the primary color buffer 122.

The DMA controllers 114 and 154 are intercoupled to facilitate the transfer of color data, and may be intercoupled by the DMA bus 130. When the DMA bus is used for the DMA transfers, the DMA bus 130 may include at least one data signal and a clock signal. More preferably, the DMA bus 130 may include multiple data signals along with the clock signal, and in one embodiment, eight data signals and a clock signal may be included in the DMA bus 130. In order to provide a fast means of data transfer, the data portion of the DMA bus 130 may be "double clocked", such that valid data is present on the data portion of the DMA bus 130 at both the rising and falling edges of the clock portion of the DMA bus. Maintaining a limited number of data signals on the DMA bus 130 can help to reduce the number of pins required for packaging of the primary processor 110 and the secondary processor 150 when each is manufactured as an individual integrated circuit.

DETAILED DESCRIPTION OF EMBODIMENT OF INVENTION

In other embodiments, the secondary processor 150 may include a DMA controller that transfers the color data for the second portion of the frame to the primary color buffer via the shared bus structure 172 or through some other link to the primary memory 120. In such an embodiment, the DMA controller included in the secondary processor 150 may perform all of the necessary addressing for the DMA transfers. Thus, the DMA controller within the secondary processor 150 may generate both the source addresses corresponding to the secondary color buffer 162 in the secondary memory 160 and the destination addresses corresponding to the primary color buffer 122 in the primary memory 120.

Although block DMA transfers are preferable for transferring large amounts of color data from the secondary memory 160 to the primary memory 120, DMA or block transfers are not mandatory for operation of the system illustrated in FIG. 1. In some embodiments, the primary processor 110 issues individual memory read requests to the secondary processor 150 which facilitates fetching of the required data from the secondary memory and relays the data back to the primary processor 110.

The division of the processing responsibilities with respect to the frame may be performed in a variety of ways. In one embodiment, the first and second portions essentially separate the frame in halves. Thus, the first portion may include the left half of the frame and the second portion the right half of the frame. In other embodiments, the division may not be equal, which may be advantageous in instances where either the primary or secondary processor 110 or 150 has more available processing bandwidth than the other. In some embodiments, the division of processing responsibilities may be performed in a dynamic manner such that the first and second portions of the image data for the frame are dynamically determined. For example, the second processor 150 may be actively performing other functions and only utilized as a reserve processor when the primary processor 110 becomes overloaded.

Because the secondary processor 150 is only processing a portion of the image data for the frame, the secondary memory 160 need only allocate storage locations for those pixels for which the secondary processor 150 is responsible. Thus, if the secondary processor 150 processes the right half of the frame, the secondary memory 160 need only allocate memory locations for pixels included in that half of the frame. Thus, the secondary color buffer 162 will include a corresponding pixel location for each pixel included in the second portion of the frame. Similarly, the secondary Z buffer 164 will only include a corresponding pixel location for each pixel included in the second portion of the frame.

In the circuit 100, the primary memory 120 is responsible for storing the entire set of color data for the frame in the primary color buffer 122. This is because the primary color buffer 122 is relied upon for retrieving the color data utilized for generating the display signal 118. As such, the primary color buffer 122 must include a corresponding pixel location for each pixel included in the frame. However, because the primary processor 110 is only responsible for performing processing operations on the first portion of the frame, the primary Z buffer 124 need only include a corresponding pixel location for each pixel included in the first portion. This is because the Z data for each pixel location is only used in rendering operations, and is not required for generating the display signal 118. The display signal 118 is generated from color data stored in the primary color buffer 122 and does not require any Z information.

Note that in some embodiments, the transfer of color data from the second memory 160 to the primary memory 120 may not be accomplished rapidly enough to permit the primary color buffer 122 to be utilized for both storage of incoming transferred data and for sourcing the color data required for generation of the display signal 118 by the display driver 116. In such cases, the primary memory 120 may include a first color buffer and a second color buffer where color data is transferred from the secondary memory to the first color buffer when the second color buffer is used as a display color buffer, and where the color data is transferred to the second color buffer when the first color buffer is used as the display color buffer. The display driver 116 generates the display signal from color data stored in whichever of the two color buffers is currently the display color buffer. Whichever of the first and second color buffers is not currently acting as a display buffer acts as the primary color buffer in that the processing operations performed by the primary processor 110 store color data in the primary color buffer, and data is transferred from the secondary memory 160 into the primary color buffer.

As is apparent to one of ordinary skill in the art, the use of multiple processors can be extended to include more than two processors where DMA transfers or other means of data transfer enable rendered color data to be combined for generation of a display signal. Similarly, each of the primary and secondary processors 110 and 150 may include additional functionality that utilizes the capabilities of the DMA controllers 114 and 154 to promote data exchange required for these additional capabilities. One such example is illustrated in FIG. 2.

Figure 2:
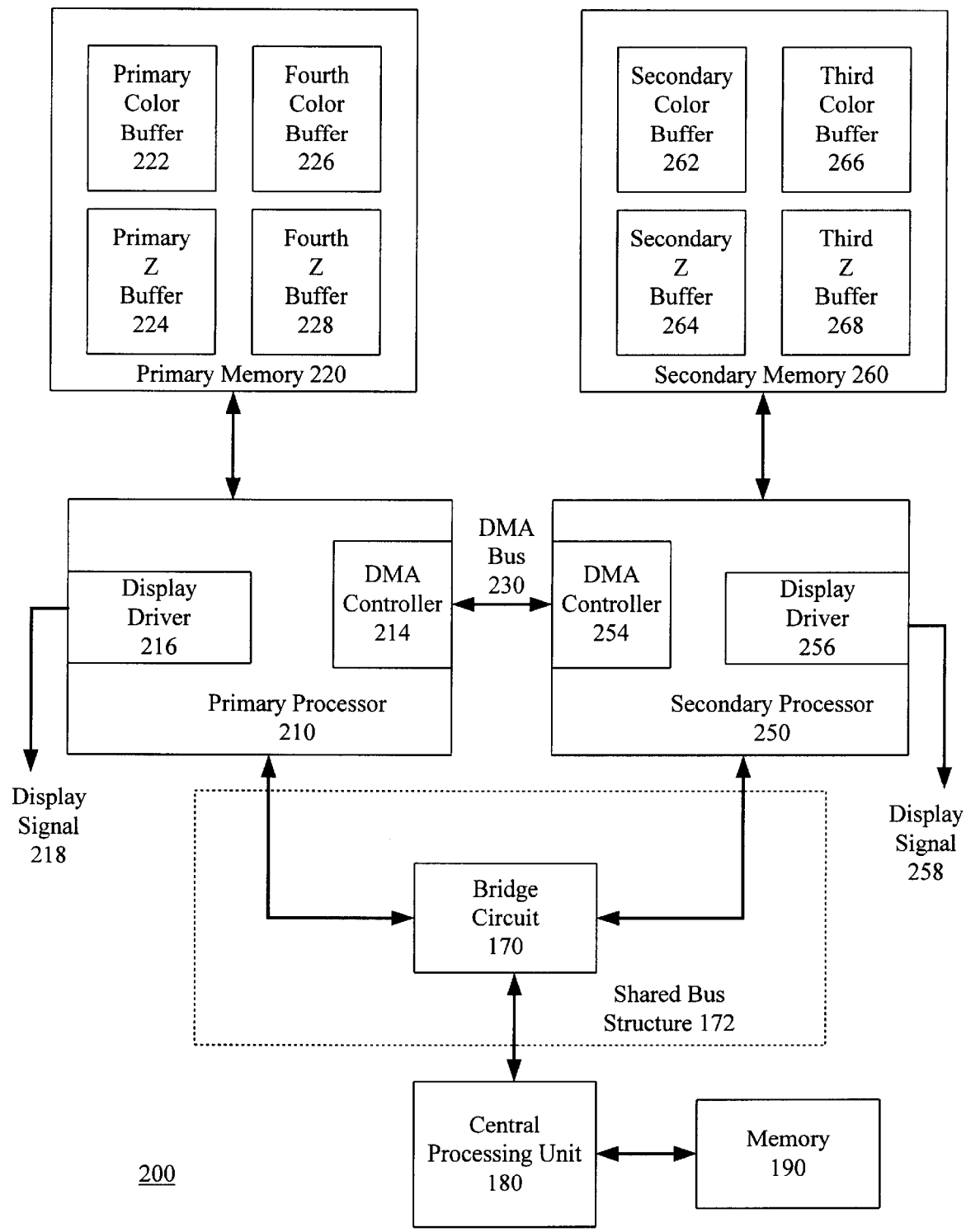
FIG. 2 illustrates a block diagram of another graphics processing circuit in accordance with a particular embodiment of the present invention.

FIG. 2 illustrates an alternate graphics processing circuit 200 that includes a primary memory 220, a secondary memory 260, a primary processor 210, and a secondary processor 250. As was the case with the graphics processing circuit of 100 of FIG. 1, the graphics processing circuit 200 of FIG. 2 may include a shared bus structure 172, bridge circuit 170, central processing unit 180, and memory 190. Each of the primary and secondary processors 210 and 250 preferably includes three-dimensional graphics processing capabilities as described with respect to the processors 110 and 150 of FIG. 1.

The graphics processing circuit 200 is similar to the graphics processing circuit 100 with the additional capability that the secondary processor 250 generates an additional display signal 258 using a built-in display driver 256. Preferably, the display driver 256 includes a digital analog converter such that an analog display signal can be generated. In the embodiment illustrated in FIG. 2, each of the primary and secondary processors 210 and 250 is responsible for generating a display signal for a separate frame. Portions of the processing responsibilities for different pixel locations in each of these two frames may be divided between the primary and secondary processors 210 and 250 such that the primary processor 210 may perform some of the processing functions for the frame data that results in the display signal 258 and the display signal 218, and the secondary processor 250 may perform some of the processing functions for the frame data used to generate the display signal 218 and the display signal 258.

In order to facilitate this division of processing responsibilities, the primary memory 220 is shown to include a primary color buffer 222 and a primary Z buffer 224. The primary color buffer 222 and primary Z buffer 224 correspond to processing operations for the frame that results in the display signal 218. Thus, the display driver 216 will retrieve the color data required to generate the display signal 218 from the primary color buffer 222.

As was the case with the processing circuit of FIG. 1, the secondary memory 260 includes a secondary color buffer 262 and a secondary Z buffer 264 that correspond to the frame used for generation of the display signal 218. Thus, the primary processor 210 or the CPU 180 generates data transfer indications that are relayed to the secondary processor 250 such that color data stored within the secondary color buffer 262 is transferred to the primary color buffer 222 for use in generating the display signal 218. As was the case with the circuit of FIG. 1, the transfer of data may utilize DMA transfers via the DMA controllers 214 and 254 that may be intercoupled via a DMA bus 230.

The secondary memory 260 is also shown to include a third color buffer 266 and a third Z buffer 268. The third color buffer 266 and the third Z buffer 268 correspond to the frame used for generation of the display signal 258. Thus, the display driver 256 will generate the display signal 258 based on color data stored within the third color buffer 266. In order for the primary processor 210 to assist the secondary processor 250 in processing graphics information for the frame used to produce the display signal 258, the primary memory 220 includes a fourth color buffer 226 and a fourth Z buffer 228. The fourth color buffer 226 and the fourth Z buffer 228 function in a similar manner for the display signal 258 as the secondary color buffer 262 and the secondary Z buffer 264 function for the display signal 218. Similar DMA transfers to those used to move data from the secondary memory 260 to the primary memory 220 can be employed in the opposite direction to enable data to be moved from the primary memory 220 the secondary memory 260.

In an embodiment such as that illustrated in FIG. 2, the dynamic division of the processing responsibilities for the different frames may become more relevant to maximizing the available processing power of the two processors. If one processor is required to process a very complicated image, it can offload some of the processing responsibilities onto the other processor, where the other processor may be processing a much simpler image and thus have bandwidth to spare. Thus, the variance in the requirements for processing bandwidth can be spread amongst multiple processors, ensuring that the needs of each display are adequately met.

Figure 3:
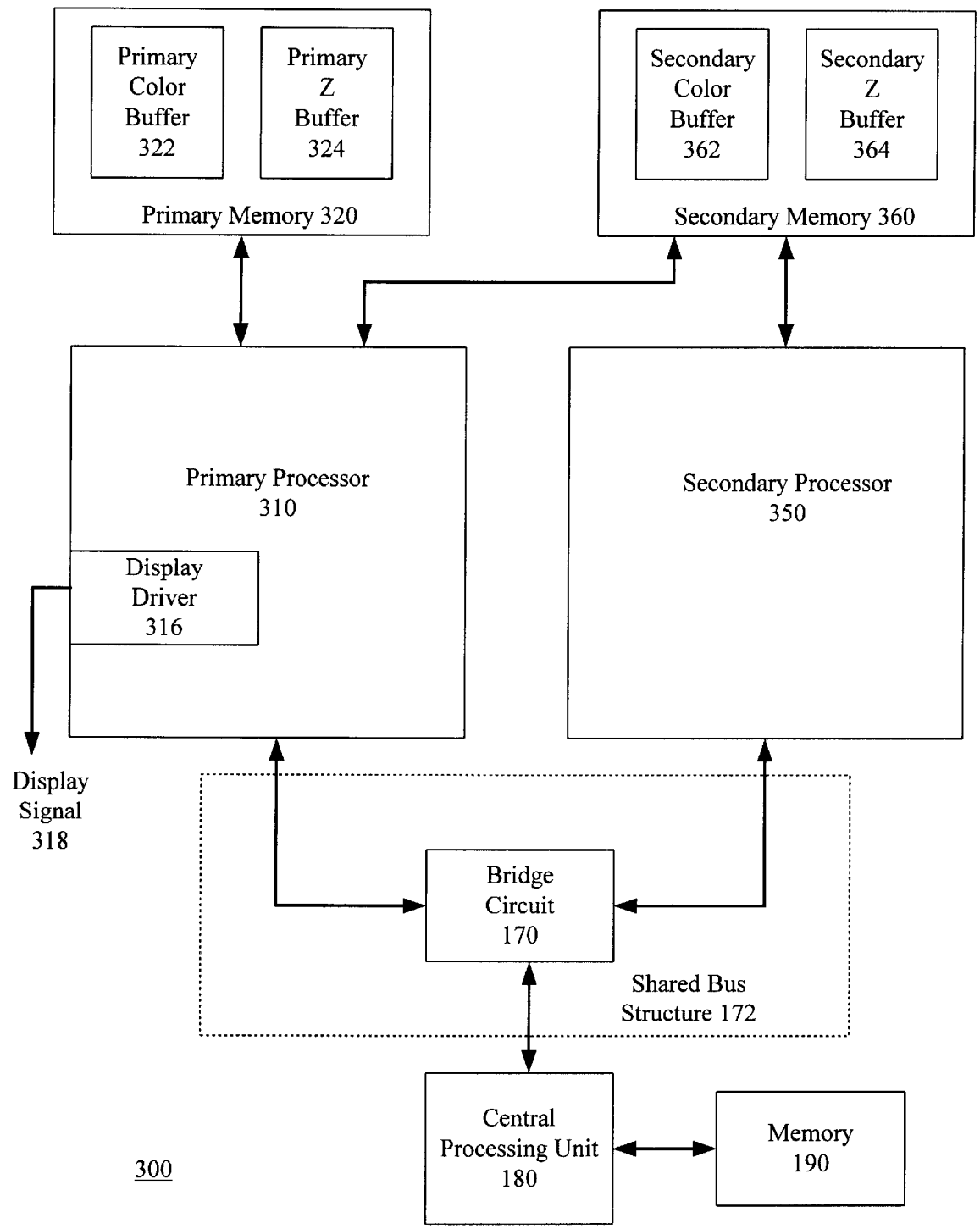
FIG. 3 illustrates a block diagram of yet another graphics processing circuit in accordance with a particular embodiment of the present invention.

FIG. 3 illustrates another embodiment of a graphics processing circuit 300 that allows the processing bandwidth requirements for a particular frame to be divided amongst multiple processors. The graphics processing circuit 300 of FIG. 3 is shown to include a primary memory 320, a secondary memory 360, a primary processor 310, and a secondary processor 350. As was the case with the circuit 100 of FIG. 1, the primary and secondary processors 310 and 350 may be coupled to a central processing unit 180 that executes software stored in the memory 190. The interconnection between the processors and the central processing unit 180 may be through a shared bus structure 172 that may include a bridge circuit 170.

In the embodiment illustrated in FIG. 3, the secondary processor 350 processes a second portion of the image data for the frame. The secondary processor 350 utilizes the secondary memory 360 as local memory. Thus, the processing operations performed by the secondary processor 350 store color data in the secondary color buffer 362 and store Z data in the secondary Z buffer 364.

The primary processor 310 processes a first portion of the image data for the frame and stores color data in the primary color buffer 322 and Z data in the primary Z buffer 324. Note that the processing operations performed by the primary and secondary processors 310 and 350 preferably include three-dimensional graphics processing operations such that each includes a three-dimensional rendering graphics processing pipeline.

In the embodiment illustrated in FIG. 3, the display signal 318 is generated by a display driver 316 that is included within the primary processor 310. Thus, the inclusion of the display driver 316, which may include a digital to analog converter, in the primary processor 310 enables the advantages of including the display driver within the processing circuit to be realized. However, the display driver 316 is configured such that it is able to generate the display signal 318 by retrieving color data from both the primary color buffer 322 and the secondary color buffer 362. Thus, the display driver 316 is able to directly access both of the color buffers 322 and 362 to get the color data it requires to generate the display signal 318. This eliminates the need for transferring the data from the secondary memory 360 to the primary memory 320 as was required in the circuit of FIG. 1.

Because the color data used to generate the display signal 318 is fetched from both the primary color buffer 322 and the secondary color buffer 362, the size of the primary color buffer 322 need only be such that a pixel location for each pixel within the first portion of the frame be included in the primary color buffer 322. Similarly, the secondary color buffer 362 will only include pixel locations for those pixels included in the second portion of the frame. Note that the primary and secondary color buffers 322 and 362 may lie on a common bus that is coupled to the primary processor 310 such that the addresses asserted on the bus to retrieve data from the color buffers select which of the color buffers will return the required color data.

Figure 4:
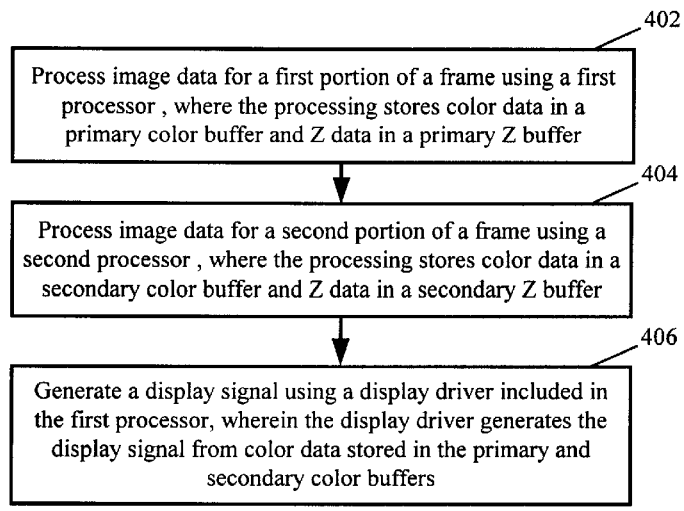
FIG. 4 illustrates a flow diagram of a method for graphics processing in accordance with a particular embodiment of the present invention.

FIG. 4 illustrates a flow diagram of a method for graphics processing, where the method illustrated in FIG. 4 includes some of the general functionality of the circuitry included in FIG. 3. The method begins at step 402 where image data for a first portion of a frame is processed using a first processor. Preferably, the processing operations performed include three-dimensional processing operations such as three-dimensional rendering. The processing operations performed by the first processor store color data in a primary color buffer and Z data in a primary Z buffer. The primary color buffer and the primary Z buffer are preferably included in a primary memory structure.

At step 404, image data for a second portion of the frame is processed using a second processor. The processing operations performed by the second processor are preferably similar to those of the first processor, but directed toward a different portion of the frame. Preferably, the combination of the first and second portions of the frame equates to the frame in its entirety. The processing operations performed by the second processor store color data in a secondary color buffer and Z data in a secondary Z buffer. The secondary color buffer and the secondary Z buffer are included in a secondary memory structure.

Once processing for a particular frame has completed, a display signal is generated at step 406. The display signal is generated using a display driver that is included in the first processor, where the display driver generates the display signal from color data stored in the primary color buffer and the secondary color buffer. Thus, the display driver is able to retrieve color data for generating the display signal from both the primary and secondary color buffers. Note that the primary processor is preferably implemented as an integrated circuit that includes the display driver such that the advantages of including the display driver within the integrated circuit of the graphics processor are realized.

Figure 5:
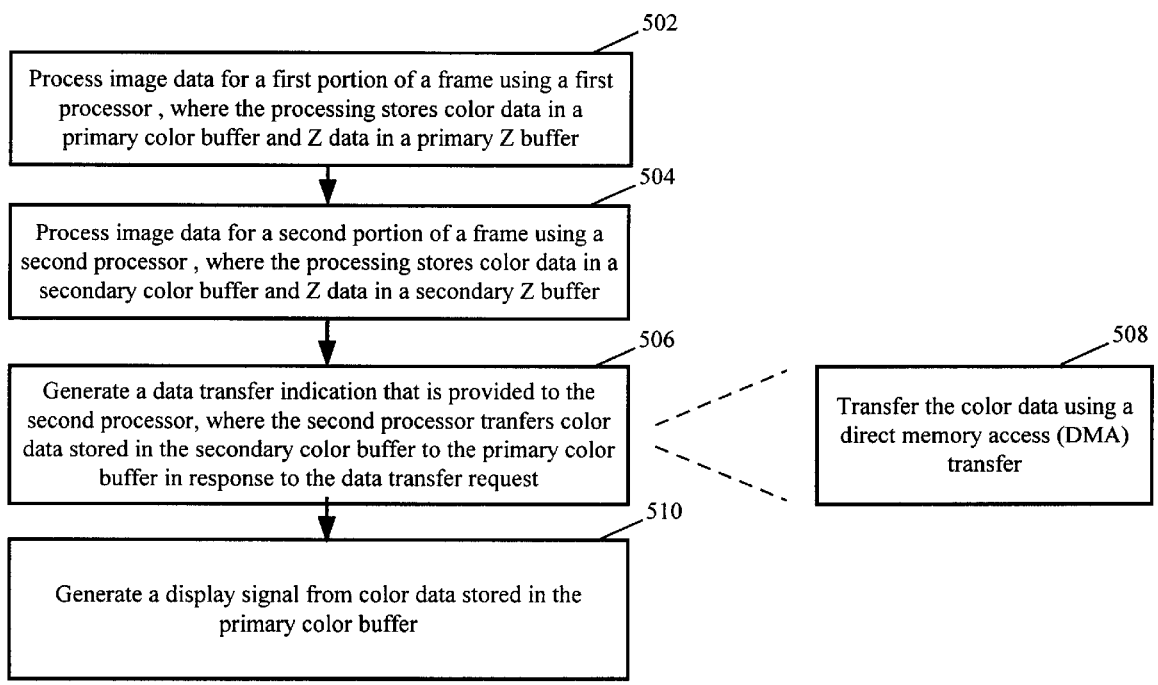
FIG. 5 illustrates a flow diagram of another method for graphics processing in accordance with a particular embodiment of the present invention.

FIG. 5 illustrates a flow diagram of another method for graphics processing, where the flow diagram of FIG. 5 corresponds to the general methodology associated with the circuitry illustrated in FIG. 1. The method begins at step 502 where image data for first portion of a frame is processed using a first processor. Step 502 is substantially similar to step 402 of FIG. 4 in that the type of processing is the same, and a primary color buffer and primary Z buffer included in a primary memory are utilized in the processing. Correspondingly, step 504 is similar to step 404 in that step 504 includes processing image data for a second portion of the frame using a second processor that stores color data in a secondary color buffer and Z data in a secondary Z buffer.

At step 506, a data transfer indication is generated that is provided to the second processor. Preferably, the generation of the data transfer indication is based on a vertical blanking interval or other portion of the display signal such that the data transfer can occur in an efficient manner that minimizes any impact on generation of a display signal. Upon receipt of the data transfer indication, the second processor transfers color data stored in the secondary color buffer to the primary color buffer. Such data transfer may occur as illustrated at step 508 such that the transfer is accomplished via DMA operations.

Finally, at step 510, a display signal is generated from color data stored in the primary color buffer. In the method illustrated in FIG. 5, all of the relevant color data needed for generating the display signal has been stored or relocated to the primary color buffer such that the display signal can be generated from color data fetched exclusively from the primary color buffer. The primary color buffer includes color data generated by both the first and second processors, thus allowing the parallel processing operations of the processors to jointly render the image data for the frame.

By enabling multiple graphics processors to cooperate in performing the graphics processing operations required for generating image data for a particular frame, the processing bandwidth in a graphics processing system can be increased. By allowing each of the processors to utilize local memory in performing the processing operations that may require multiple memory accesses, the efficiency with which the processing can be performed is increased. Once the image data for the frame has been generated, the portions generated by each processor can be combined into a single memory structure such that a display driver can easily fetch the color data it requires to generate a display signal. In other embodiments, the display driver is capable of fetching the color data it requires from multiple memory structures such that the transference of the color data into a single memory structure is not required.

It should be understood that the implementation of other variations and modifications of the invention in its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A graphics processing circuit, comprising:
   a primary memory that includes a primary color buffer and a primary Z buffer;
   a secondary memory that includes a secondary color buffer and a secondary Z buffer;
   a primary processor operably coupled to the primary memory, wherein the primary processor processes a first portion of image data for a frame, wherein processing the first portion stores color data for the first portion in the primary color buffer and Z data for the first portion in the primary Z buffer, wherein the primary processor includes a display driver, wherein the display driver generates a display signal from color data stored in the primary color buffer; and
   a secondary processor operably coupled to the secondary memory and the primary processor, wherein the secondary processor processes a second portion of the image data for the frame, wherein processing the second portion stores color data for the second portion in the secondary color buffer and Z data for the second portion in the secondary Z buffer, wherein the secondary processor receives a data transfer indication from the primary processor, wherein the secondary processor transfers color data for the second portion from the secondary color buffer to the primary color buffer in the primary memory based on the data transfer indication.

2. The graphics processing circuit of claim 1 wherein the data transfer indication is relayed using a signal line operably coupled to the primary and secondary processors.

3. The graphics processing circuit of claim 1 further comprises a shared bus structure operably coupled to the primary and secondary processors, wherein the shared bus structure couples the primary and secondary processors to a central processing unit.

4. The graphics processing circuit of claim 3 wherein the central processing unit generates the data transfer indication.

5. The graphics processing circuit of claim 3 wherein the data transfer indication is relayed using the shared bus structure.

6. The graphics processing circuit of claim 3 further comprises a bridge operably coupled to the primary and secondary processors, wherein the bridge couples the primary and secondary processors to the shared bus structure.

7. The graphics processing circuit of claim 1 wherein the primary color buffer includes a corresponding pixel location for each pixel included in the frame, wherein the primary Z buffer includes a corresponding pixel location for each pixel included in the first portion, and wherein the secondary color buffer and the secondary Z buffer each include a corresponding pixel location for each pixel included in the second portion.

8. The graphics processing circuit of claim 1 wherein primary and secondary processors each include a direct memory access (DMA) controller, wherein the DMA controllers are intercoupled to facilitate transfer of color data.

9. The graphics processing circuit of claim 8 further comprises a DMA bus operably coupled to the DMA controllers of the primary and secondary processors, wherein the DMA bus includes at least one data signal and a clock signal.

10. The graphics processing circuit of claim 9 wherein the primary processor generates the data transfer indication based on a vertical blanking interval corresponding to the display signal.

11. The graphics processing circuit of claim 1 wherein each of primary and secondary processors include a three-dimensional graphics rendering pipeline.

12. The graphics processing circuit of claim 1 wherein the secondary processor includes a DMA controller that transfers the color data for the second portion to the primary color buffer via a shared bus structure that intercouples the primary and secondary processors, wherein the shared bus structure couples the primary and secondary processors to a central processing unit, and wherein the DMA controller generates source addresses corresponding to the secondary memory and destination addresses corresponding to the primary memory.

13. The graphics processing circuit of claim 1 wherein the first and second portions of the image data for the frame are dynamically determined.

14. The graphics processing circuit of claim 1, wherein:
   the secondary memory includes a third color buffer and a third Z buffer;
   the primary memory includes a fourth color buffer and a fourth Z buffer;
   the secondary processor processes a first portion of image data for a second frame, wherein processing the first portion of image data for the second frame stores color data in the third color buffer and Z data in the third Z buffer, wherein the secondary processor includes a second display driver that generates a second splay signal from color data stored in the third color buffer; and
   the primary processor processes a second portion of the image data for the second frame, wherein processing the second portion of image data for the second frame stores color data in the fourth color buffer and Z data in the fourth Z buffer, wherein the primary processor receives a second data transfer indication from the secondary processor, wherein the primary processor transfers color data for the second portion of the image data for the second frame from the fourth color buffer to the third color buffer based on the second data transfer indication.

15. The graphics processing circuit of claim 1 wherein the primary memory includes a first color buffer and a second color buffer, wherein the color data is transferred from the secondary memory to the first color buffer that is acting as the primary color buffer when the second color buffer is used as a display color buffer, wherein the color data is transferred from the secondary memory to the second color buffer that is acting as the primary color buffer when the first color buffer is used as the display color buffer, wherein the display driver generates the display signal from color data stored in the display color buffer.

16. A graphics processing circuit, comprising:
   a primary memory that includes a primary color buffer and a primary Z buffer, wherein the primary color buffer includes a pixel location corresponding to each pixel of a frame, wherein the primary Z buffer includes a pixel location for each pixel of a first portion of the frame;
   a secondary memory that includes a secondary color buffer and a secondary Z buffer, wherein the secondary color buffer and the secondary Z buffer each include a pixel location for each pixel of a second portion of the frame;
   a primary graphics processor operably coupled to the primary memory, wherein the primary graphics processor processes image data corresponding to the first portion of the frame, wherein processing for the first portion stores color data for the first portion in the primary color buffer and Z data for the first portion in the primary Z buffer, wherein the primary graphics processor includes a display driver, wherein the display driver generates a display signal from color data stored in the primary color buffer, wherein the primary graphics processor includes a primary DMA controller that generates addresses corresponding to the primary color buffer for DMA transfers to the primary color buffer; and
   a secondary graphics processor operably coupled to the secondary memory and the primary graphics processor, wherein the secondary graphics processor processes a second portion of the image data for the frame, wherein processing the second portion stores color data for the second portion in the secondary color buffer and Z data for the second portion in the secondary Z buffer, wherein the secondary graphics processor receives a data transfer indication from the primary graphics processor, wherein the secondary graphics processor transfers color data for the second portion from the secondary color buffer to the primary color buffer in the primary memory based on the data transfer indication, wherein the secondary graphics processor includes a secondary DMA controller that generates addresses corresponding to the secondary color buffer for DMA transfers to the primary color buffer.

17. The graphics processing circuit of claim 16, wherein the primary DMA controller of the primary graphics processor is operably coupled to the secondary DMA controller of the secondary graphics processor via a bus structure that includes a plurality of data signals and a clock signal.

18. The graphics processing circuit of claim 17, wherein each of the primary and secondary graphics processors include at least a portion of a three-dimensional graphics rendering pipeline, wherein each of the primary and secondary graphics processors perform three-dimensional processing operations on image data for the frame.

19. The graphics processing circuit of claim 18, wherein the primary graphics processor further comprises a control block, wherein the control block generates the data transfer indication to correspond to a vertical blanking interval of the display signal.

20. The graphics processing circuit of claim 19, wherein at least one of the primary and secondary memories store texture data used in processing image data.

21. A graphics processing circuit, comprising:
   a primary memory that includes a primary color buffer and a primary Z buffer;
   a secondary memory that includes a secondary color buffer and a secondary Z buffer;
   a primary processor operably coupled to the primary memory, wherein the primary processor processes a first portion of image data for a frame, wherein processing the first portion stores color data for the first portion in the primary color buffer and Z data for the first portion in the primary Z buffer, wherein the primary processor includes a display driver, wherein the display driver generates a display signal from color data stored in the primary color buffer and the secondary color buffer; and
   a secondary processor operably coupled to the secondary memory and the primary processor, wherein the secondary processor processes a second portion of the image data for the frame, wherein processing the second portion stores color data for the second portion in the secondary color buffer and Z data for the second portion in the secondary Z buffer.

22. A method for graphics processing, comprising:

processing image data for a first portion of a frame using a first processor, wherein processing operations performed by the first processor store color data in a primary color buffer and Z data in a primary Z buffer, wherein the primary color buffer and the primary Z buffer are included in a primary memory;

processing image data for a second portion of the frame using a second processor, wherein processing operations performed by the second processor store color data in a secondary color buffer and Z data in a secondary Z buffer, wherein the secondary color buffer and the secondary Z buffer are included in a secondary memory; and generating a display signal using a display driver included in the first processor, wherein the display driver generates the display signal from color data stored in the primary color buffer and the secondary color buffer.

23. A method for graphics processing, comprising:

processing image data for a first portion of a frame using a first processor, wherein processing operations performed by the first processor store color data in a primary color buffer and a primary Z buffer, wherein the primary color buffer and the primary Z buffer are included in a primary memory;

processing image data for a second portion of the frame using a second processor, wherein processing operations performed by the second processor store color data in a secondary color buffer and Z data in a secondary Z buffer, wherein the secondary color buffer and the secondary Z buffer are included in a secondary memory;

generating a data transfer indication that is provided to the second processor, wherein upon receipt of the data transfer indication, the second processor transfers color data stored in the secondary color buffer to the primary color buffer; and generating a display signal from color data stored in the primary color buffer, wherein the color data in the primary color buffer includes color data generated by the first and second processors.

24. The method of claim 23, wherein the second processor transfers color data to the primary color buffer using a direct memory access (DMA) transfer.

* * * * *